US 6,607,357 B2

(12) United States Patent
Caramaschi

(10) Patent No.: US 6,607,357 B2
(45) Date of Patent: Aug. 19, 2003

(54) AIRCRAFT CONSTANT-VELOCITY TRANSMISSION ROTOR

(75) Inventor: Vittorio Caramaschi, Gallarate (IT)

(73) Assignee: Agusta S.p.A., Samarate (IT)

( * ) Notice: Subject to any disclaimer, the term of this patent is extended or adjusted under 35 U.S.C. 154(b) by 0 days.

(21) Appl. No.: 10/059,056

(22) Filed: Jan. 30, 2002

(65) Prior Publication Data
US 2002/0135239 A1 Sep. 26, 2002

(30) Foreign Application Priority Data
Feb. 2, 2001 (IT) ...................... TO2001A0101

(51) Int. Cl.⁷ ............................................... B64C 27/35
(52) U.S. Cl. ............... 416/134 A; 416/148; 416/170 R; 416/244 R
(58) Field of Search ............... 416/170, 210 R, 416/244 R, 134 A, 148

(56) References Cited

U.S. PATENT DOCUMENTS 2,827,777 A   3/1958  Molyneux et al.
3,207,226 A * 9/1965  Caldwell ................... 416/148
3,744,743 A * 7/1973  Nay et al. ................. 244/17.11
4,729,753 A * 3/1988  Neathery et al. ............ 464/71

FOREIGN PATENT DOCUMENTS

EP   0 327 672   8/1989
EP   1 088 755   4/2001
FR   2 666 630   3/1992

* cited by examiner

Primary Examiner—Ninh H. Nguyen
(74) Attorney, Agent, or Firm—Liniak, Berenato & White

(57) ABSTRACT

An aircraft rotor having a drive shaft, a number of blades extending substantially radially with respect to the shaft, and a constant-velocity transmission connecting the blades to the shaft; the transmission having a hub supported adjustably about a fixed pole, a drive member integral with the shaft, a driven member integral with the hub, and a number of torque transmitters, each connected to a first attachment, carried by the drive member, and to a second attachment, carried by the driven member, by means of a first hinge and a second hinge respectively; the axes of the first hinges and second hinges defining respective planes on opposite sides of and symmetrical with respect to a bisecting plane coincident, in stationary conditions, with the plane of the hub.

17 Claims, 5 Drawing Sheets

US 6,607,357 B2

AIRCRAFT CONSTANT-VELOCITY TRANSMISSION ROTOR

The present invention relates to an aircraft rotor with a constant-velocity transmission. The invention preferably applies to tilt-rotor aircraft or convertiplanes, but may also be used on conventional helicopters, e.g. a tail rotor.

BACKGROUND OF THE INVENTION

To combine the speed, range and performance of fixed-wing turbo-propeller craft and the hovering and vertical takeoff and landing capability of a helicopter, convertible aircraft or so-called convertiplanes have been devised, which have the same external structure as a turbo-propeller airplane, but are equipped with rotors which can be tilted upwards to provide the lift of a helicopter, and forwards to provide the thrust of an airplane, so that the craft can take off and land in confined spaces like a helicopter, and cruise at high speed and altitude like an airplane. The advantages of such a combination, with respect to a conventional helicopter, are: almost twice the cruising speed (500 as opposed to 300 km/h); substantially twice the distance and time range for a given load and fuel capacity, thus increasing effective utilization of the craft; and over twice the cruising altitude, so that, for most of its flying time, the craft is unaffected by weather conditions (cloud, turbulence). As compared with a conventional airplane, on the other hand, the craft can hover and take off and land in confined spaces.

One of the main dynamic problems of helicopter rotors, and which is further compounded in the case of convertiplanes on account of the anomalous operating conditions of these during conversion, is controlling the vibratory forces acting on the rotor. These are mainly due to the gyroscopic effects produced jointly by tilting the rotor axis with respect to that of the transmission shaft, and variations in angular velocity when the rotor transmission fails to ensure perfectly constant-velocity transmission from the main transmission shaft to the rotor hub.

Various types of aircraft rotor transmissions are known. In one solution, the hub is supported on a spherical bearing to rotate about a pole, and is connected to a drive member, integral with the main shaft, by a transmission member in the form of a substantially toroidal, flexible member and made of composite material. Though relatively straightforward in design, the dynamic problems described above result, when the transmission member is deformed under load, in bobbing of the hub, which in turn results in additional inertial and aerodynamic forces on the blades.

In other known solutions, the hub is connected to the drive member, integral with the transmission shaft, in articulated manner by means of a number of compasses or tangential rods. Such solutions normally pose more or less serious problems of vibration, depending on the kinematic arrangement adopted, and are complicated, subject to wear, are unreliable, and adapt poorly to different design specifications.

SUMMARY OF THE INVENTION

It is an object of the present invention to provide an aircraft rotor designed to eliminate the aforementioned drawbacks typically associate with known rotors.

According to the present invention, there is provided an aircraft rotor comprising a drive shaft, a number of blades extending substantially radially with respect to the drive shaft, and a transmission connecting said blades to said drive shaft; the transmission comprising a hub supported adjustably about a fixed pole, articulating means connecting each of said blades to said hub, and torque-transmitting means connecting said drive shaft to said hub; characterized in that said hub is symmetrical with respect to a plane of its own through said pole; and in that said torque-transmitting means comprise a drive member rotationally integral with said drive shaft, a driven member connected rigidly to said hub, and a number of torque transmitters, each connected to a first attachment carried by the drive member, and to a second attachment carried by the driven member, by means of a first hinge and a second hinge respectively; said first and second hinges having axes lying respectively in a first and a second plane on opposite sides of and symmetrical with respect to a bisecting plane coincident, in stationary rest conditions, with said plane of said hub.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
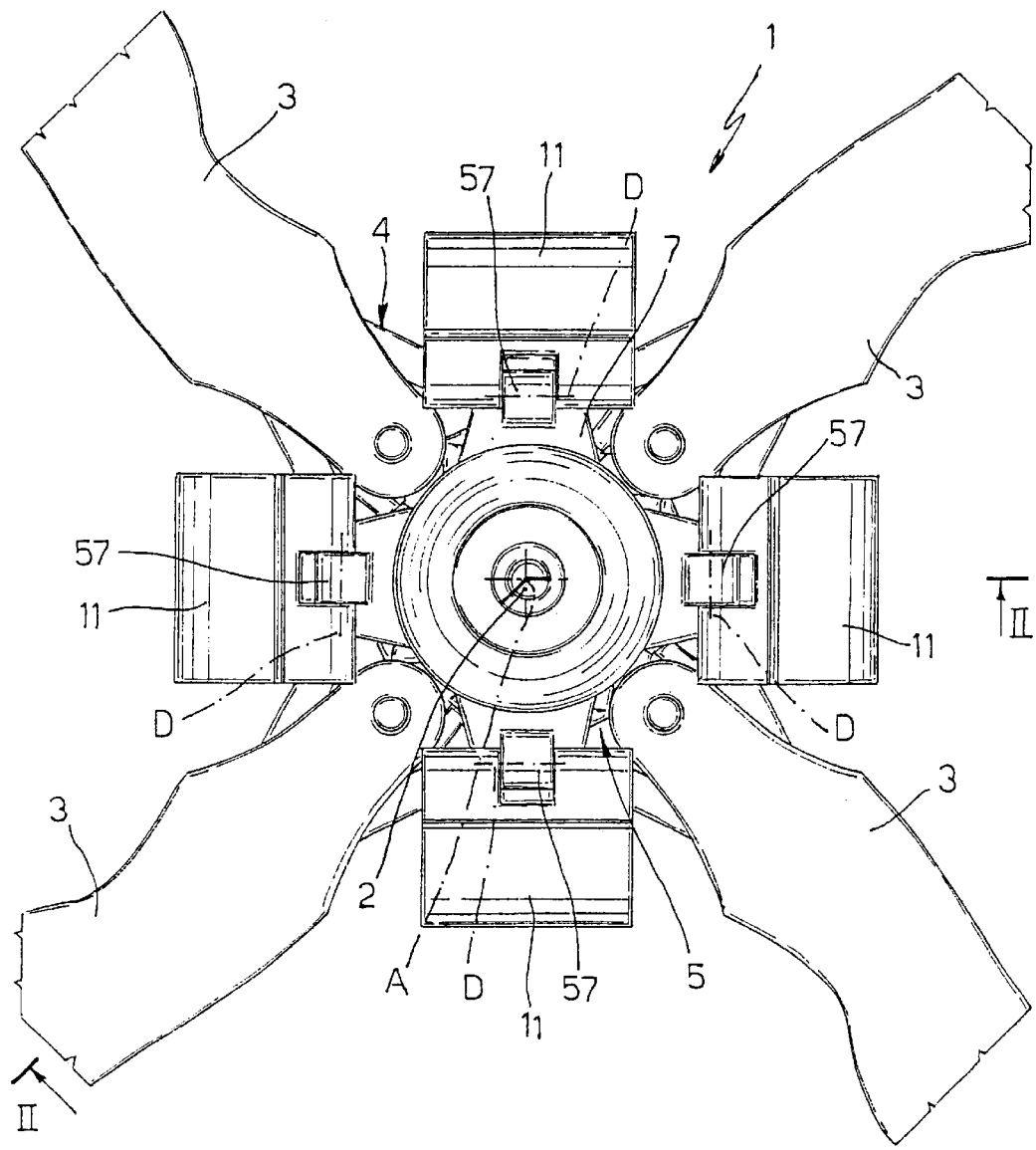
FIG. 1 shows a top plan view of a rotor in accordance with the present invention.
Figure 2:
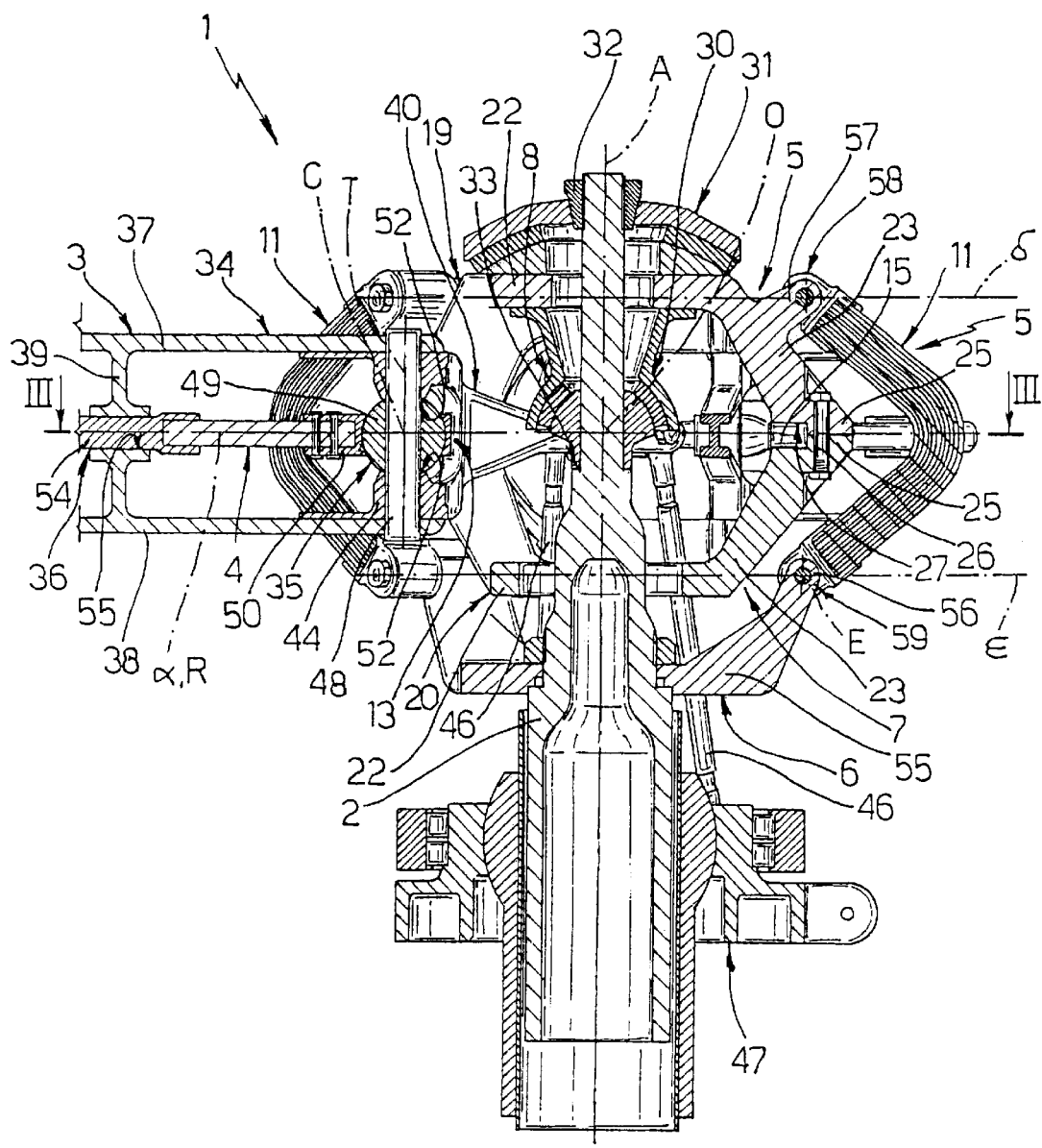
FIG. 2 shows a section along line II—II in FIG. 1.
Figure 3:
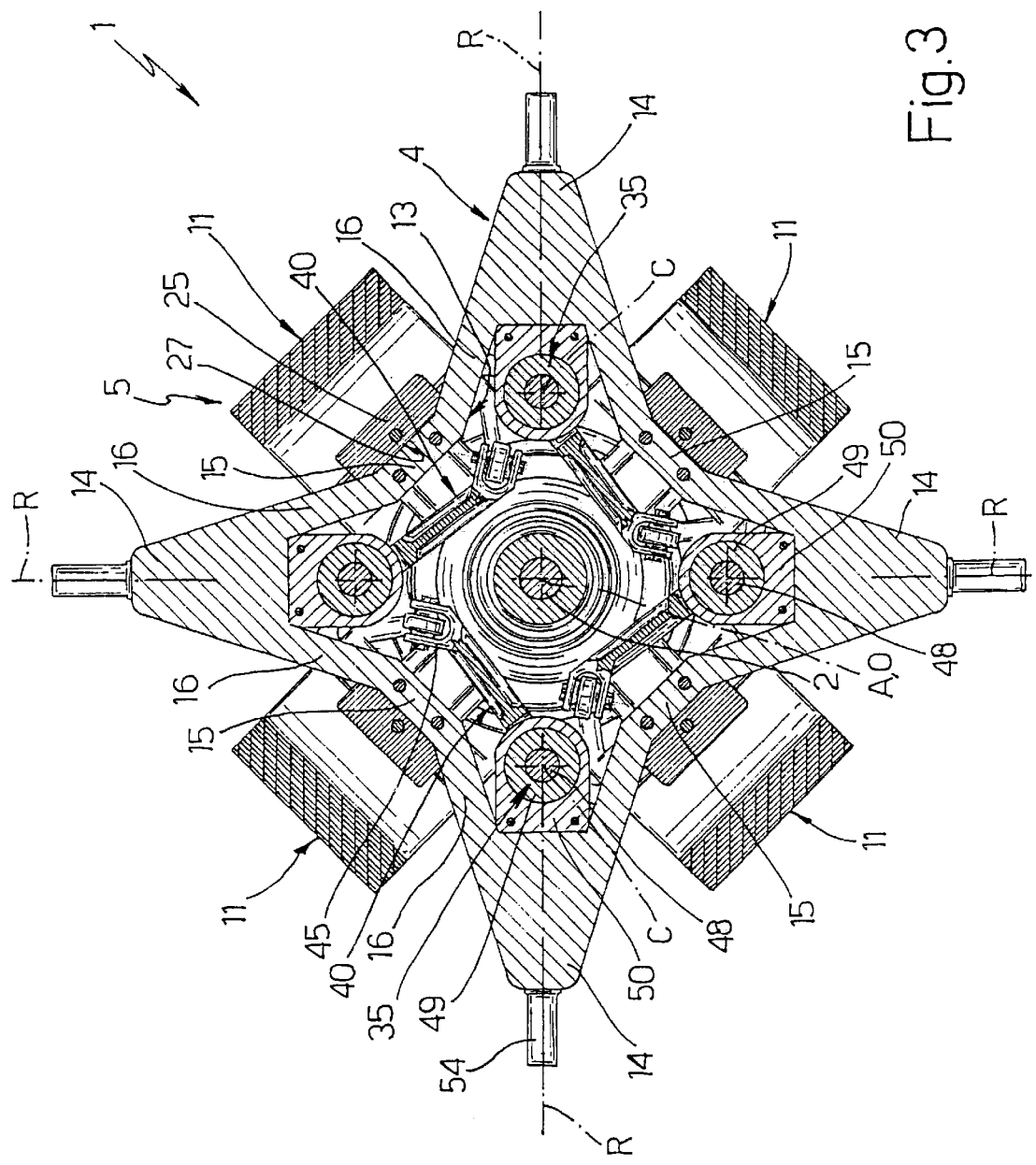
FIG. 3 shows a section along line III—III in FIG. 2.

With reference to FIGS. 1 to 3, number 1 indicates as a whole a rotor for an aircraft, in particular a convertiplane.

Rotor 1 substantially comprises a main shaft 2 of axis A; four blades 3 supported by a hub 4; and a transmission 5 connecting hub 4 to shaft 2.

Transmission 5 comprises an annular drive member 6 fitted to shaft 2; a support 7 for hub 4 (hereinafter referred to as support 7), connected to the hub rigidly and to shaft 2 by a spherical articulated joint 8 defining a fixed pole O about which hub 4 can be tilted; and a number of torque transmitters 11 connecting drive member 6 to support 7, which defines a driven member.

With particular reference to FIG. 3, hub 4 is defined by a flat plate extending in a mid-plane α and substantially in the form of a four-pointed star with a cross-shaped central opening 13. More specifically, hub 4 comprises four angularly equally spaced radial arms 14 defining the "points" of the star and to which respective blades 3 are connected; and four intermediate drive portions 15 alternating with arms 14 and fixed rigidly to support 7.

The drive portions are elongated tangentially and located radially inwards with respect to arms 14, to which they are connected integrally by pairs of beams 16. More specifically, each arm 14 is substantially in the form of an isosceles trapezium, with a major base facing axis A and a minor base facing outwards, and is connected to the two adjacent intermediate portions 15 by two beams 16 diverging as of arm 14 and in directions substantially along extensions of the oblique sides of arm 14. Intermediate portions 15, beams 16, and the major bases of arms 14 define the periphery of opening 13 of hub 4.

Figure 4:
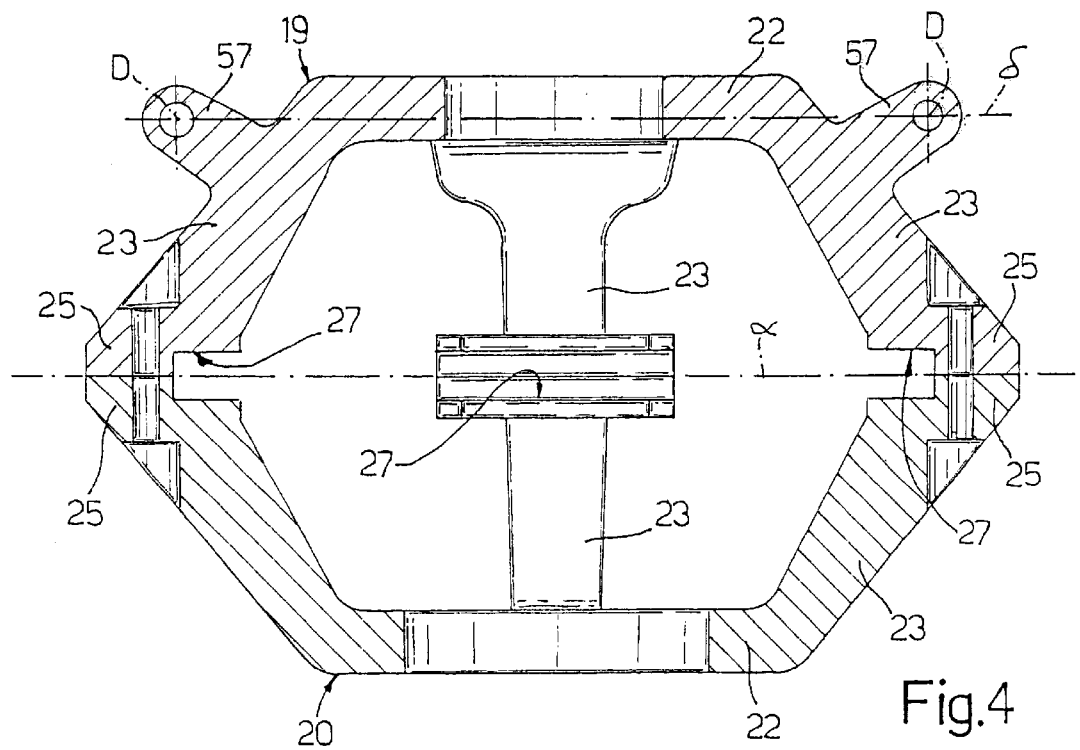
FIG. 4 shows an axial section of a driven member of a FIG. 1 rotor transmission.

Support 7 of hub 4 has a hollow, substantially cagelike structure, and is defined by a top flange 19 and a bottom flange 20 (FIG. 4), which are substantially symmetrical with respect to plane α, and each of which comprises a flat annular base 22, and four arms 23 equally spaced angularly and projecting radially and axially from base 22.

Bases 22 of flanges 19 and 20 are parallel and have respective circular central openings 24 through which shaft 2 is fitted. Arms 23 of flanges 19 and 20 mate at plane α, at respective free ends 25 connected by screws 26, and define, internally, respective C-shaped seats 27 in which intermediate portions 15 of hub 4 are housed and locked rigidly.

Pole O of spherical articulated joint 8 is defined by the intersection of axis A and plane α; and spherical joint 8 is defined by an inner elastomeric bearing 30 and an outer elastomeric bearing 31, both having a geometrical center at pole O, and which are located on axially opposite sides of base 22 of flange 19, are coaxial with shaft 2, and form, with base 22, an assembly gripped axially by a ring nut 32 against a shoulder 33 of shaft 2.

In addition to permitting rotation of support 7 about pole O, bearings 30, 31 also provide for transmitting respective downward and upward axial loads from support 7 to shaft 2.

An end portion 34 of each blade 3 is connected to hub 4 by a spherical articulated joint 35 having a center C in plane α, and by a rotating pair 36 having a radial axis R through center C and pole O. Connection of blades 3 to hub 4 is described in detail later on with reference to one blade 3, all the others obviously being connected the same way.

More specifically, the end portion 34 of blade 3 connected to hub 4 substantially comprises two parallel plates 37, 38 connected integrally to each other by a vertical wall 39. End portion 34 is connected to a pitch control lever 40 extending substantially tangentially inside support 7, and which has one end 44 mounted between plates 37 and 38 of blade 3, and an opposite end 45 connected to a connecting rod 46 forming part of a conventional pitch control assembly 47 not described in detail.

End 44 of lever 40 is inserted between and connected to plates 37 and 38 by a centrifugal force transmission pin 48 having an axis T perpendicular to plates 37, 38 and to axis R, so as to rotate rigidly with blade 3 about axis R, and houses a first member 49 of spherical articulated joint 35, a second member 50 of which is fixed rigidly to hub 4.

More specifically, first member 49 of spherical articulated joint 35 is defined by a ball fitted through diametrically with pin 48 and locked axially between inner stop surfaces 52 of end 44 of lever 40.

Second member 50 of spherical articulated joint 35 is fixed rigidly to the major base of respective arm 14 of hub 4 (FIG. 3).

Hub 4 has four radial pins 54, of axis R, which project from respective arms 14, engage in angularly and axially sliding manner respective through seats 55 formed in walls 39 of blades 3, and define, with walls 39, respective rotating pairs 36.

Pins 54 and spherical articulated joints 35 define the transmission points for the shearing stress exchanged between blades 3 and hub 4.

Drive member 6 comprises an annular member 55 fitted conventionally to shaft 2 beneath support 7; and four appendixes projecting outwards and upwards from annular member 55 to define, at the ends, respective bottom attachments 56 for torque transmitters 11.

Respective appendixes project from arms 23 of top flange 19 of support 7 to define top attachments 57 for torque transmitters 11.

Torque transmitters 11 are defined by cantilever members secured at the ends to top attachments 57 and bottom attachments 56 by respective top hinges 58 and bottom hinges 59. Hinges 58 and 59 have respective axes D and E located tangentially with respect to axis A and lying in respective planes δ and ε, symmetrically with respect to plane α in a stationary rest condition in which plane α of the hub is perpendicular to axis A.

Figure 5:
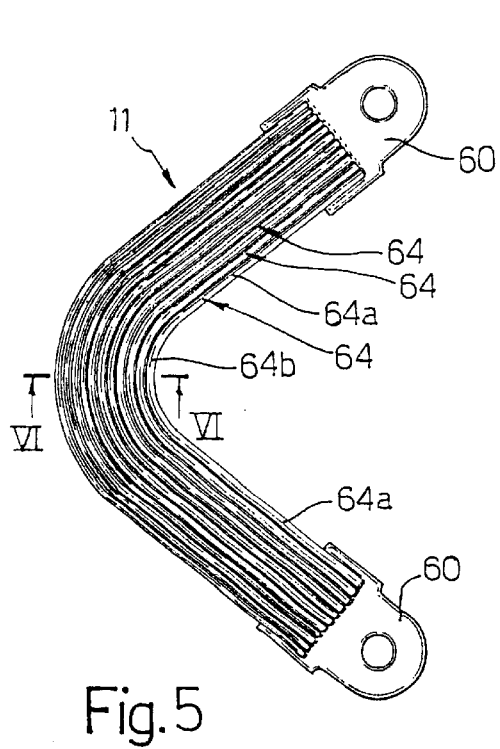
FIG. 5 shows a side view of a torque-transmitting member of the FIG. 1 rotor transmission.
Figure 6:
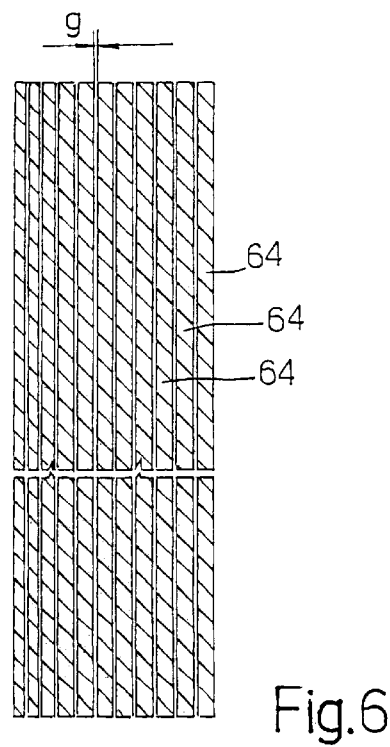
FIG. 6 shows a section along line VI—VI in FIG. 5.

With reference to FIGS. 5 and 6, each torque transmitter 11 comprises two end attachments 60 connected respectively to a top attachment 57 and a bottom attachment 56 in axially fixed manner and with the possibility of relative rotation about respective axes D, E; and a number of parallel plates 64 fixed at the ends to attachments 60. Plates 64 are curved with two substantially straight end portions 64a, and a curved intermediate portion 64b with its convexity facing outwards, and have a rectangular section extremely elongated tangentially, i.e. are extremely thin in relation to width (FIG. 6). Plates 64 are arranged side by side radially with a clearance g, so that each works individually under load, are conveniently made of carbon-fiber-based composite material, and preferably increase in thickness from the outer plate to the inner plate, to achieve uniform unit shear stress in all of plates 64, and so best exploit the resistance of the material.

Figure 7:
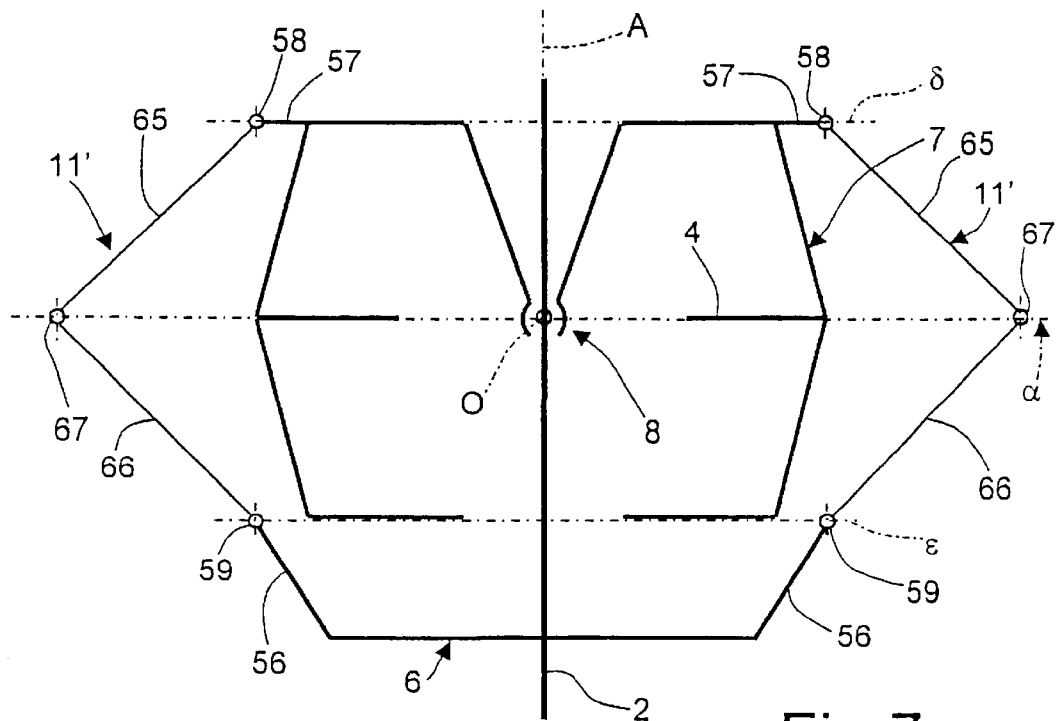
FIG. 7 shows an axial section of a variation of the rotor.
Figure 8:
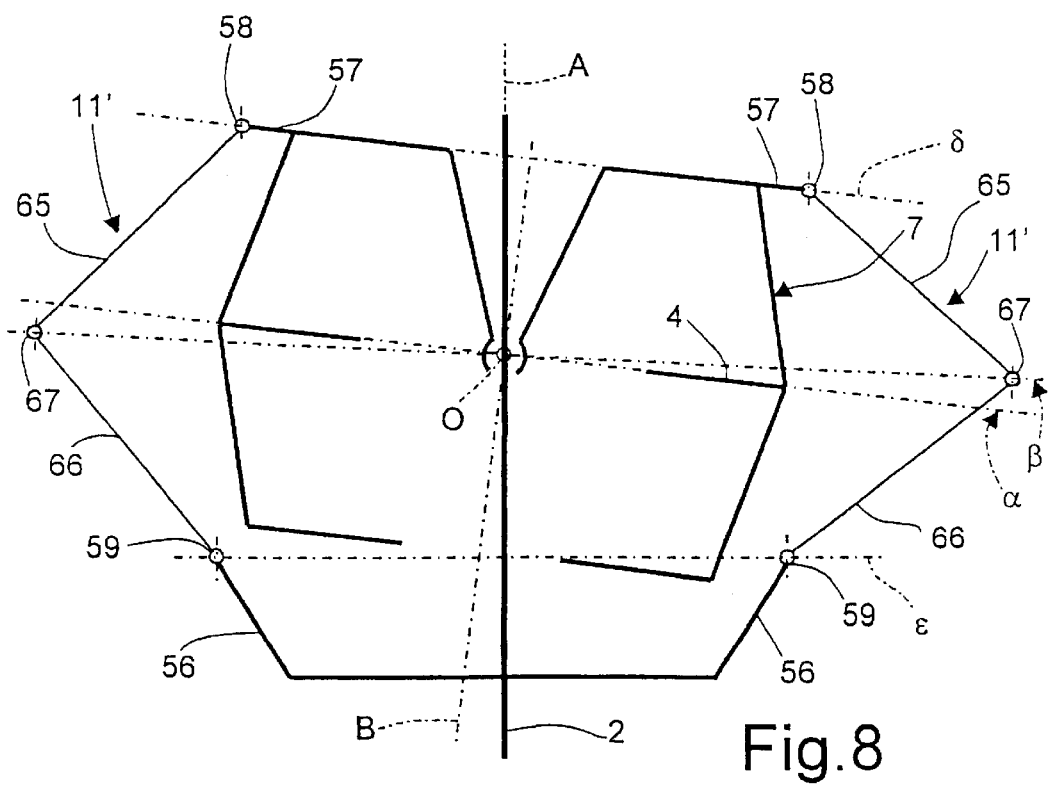
FIG. 8 shows the same view as in FIG. 7, of the rotor in a different operating condition.

Being thin in relation to width, plates 64 have poor flexural strength in the axial plane, and torsional rigidity is also reduced, so that, kinematically speaking, torque transmitters 11 may be represented (or replaced) by compass mechanisms 11' (FIG. 7) defined by a top rod 65 hinged to top attachment 57, a bottom rod 66 hinged to bottom attachment 56, and a spherical articulated joint 67 connecting the free ends of rods 65 and 66. This variation is shown in FIGS. 7 and 8, and helps to explain the kinematic behaviour of rotor 1 under load.

In actual use, the twisting torque is transmitted by drive member 6 to support 7 by torque transmitters 11 or 11'. The hub is connected rigidly to, and therefore rotates integrally with, support 7. The cone arrangement of blades 3 is made possible by the flexibility of beams 16 of hub 4.

The attitude of rotor 1 is adjusted in known manner by means of pitch control device 47. More specifically, when hub 4 slips about pole O, so that plane α of hub 4, as opposed to being perpendicular to axis A of shaft 2, is perpendicular to a hub rotation axis B through pole O (FIG. 8), the distance between the bottom and top attachments 56, 57 of torque transmitters 11 or 11' varies. As shown in FIG. 8 with particular reference to the solution with compass mechanisms 11', the centers of articulated joints 67 lie in a plane β distinct from α but still defining a bisecting plane, with respect to which planes δ and ε are symmetrical. Given this condition, transmission 5 maintains a perfectly constant velocity, i.e. the angular velocity of hub 4 about axis B, to an observer in plane α, is constant and equal to the angular velocity of shaft 2.

Torque transmitters 11 provide structurally, i.e. by deformation of plates 64, for exactly the same kinematic arrangement as described above. In this case, too, in any slip condition of hub 4, it is possible to define a plane β bisecting transmitters 11 and with respect to which planes δ and ε are symmetrical, so that, as stated above, transmission 5 maintains a perfectly constant velocity in any operating condition of rotor 1. The torque transmitter 11 embodiment provides for practically the same kinematic arrangement as compass mechanisms 11', by virtue of the poor torsional and flexural rigidity of plates 64, which, under load, undergo complex bending and twisting strain to assume a deformed configuration with respect to which plane β is a bisecting plane.

The advantages of rotor 1 according to the present invention will be clear from the foregoing description.

For the reasons given above, the rotor maintains a perfectly constant velocity transmission in any operating condition, thus eliminating, or reducing to a negligible degree, vibration induced by gyroscopic effects, and achieving a fixed, stable rotor attitude with no bobbing.

What is more, all these advantages are achieved by means of a relatively straightforward, compact, lightweight transmission 5 comprising a small number of parts.

The embodiments using cantilever torque transmitters 11 provides for reducing the number of component parts in relative motion, and the negative effects (wear, fretting) associated with it; and the control moment and stability of the rotor can be adjusted easily by adjusting the rigidity of plates 64.

Finally, the kinematic arrangement adopted provides for maximum reliability and safety, by virtue of the different load paths along which the various stress components are transmitted. More specifically, planar axial and shearing loads are transmitted solely by elastomeric bearings 30, 31, the twisting torque solely by torque transmitters 11 or 11', and the control moments partly by elastomeric bearings 30, 31 and partly by torque transmitters 11 or 11', and at any rate redundantly with regard to all the stress components.

Clearly, changes may be made to rotor 1 as described herein without, however, departing from the scope of the accompanying claims.

What is claimed is:

1. An aircraft rotor comprising a drive shaft (2), a number of blades (3) extending substantially radially with respect to the drive shaft (2), and a transmission connecting said blades (3) to said drive shaft (2); the transmission comprising a hub (4) supported adjustably about a fixed pole (0), articulating means (35, 36) connecting each of said blades (3) to said hub (4), and torque-transmitting means (6, 7, 11) connecting said drive shaft (2) to said hub (4); characterized in that said hub (4) is symmetrical with respect to a plane (α) of its own through said pole (0); and in that said torque-transmitting means (6, 7, 11) comprise a drive member (6) rotationally integral with said drive shaft (2), a driven member (7) connected rigidly to said hub (4), and a number of torque transmitters (11), each connected to a first attachment (56) carried by the drive member (6), and to a second attachment (57) carried by the driven member (7), by means of a first hinge (59) and a second hinge (58) respectively; said first and second hinges (59, 58) having axes (E, D) lying respectively in a first and a second plane (ε, δ) on opposite sides of and symmetrical with respect to a bisecting plane (β) coincident, in stationary rest conditions, with said plane (α) of said hub (4).

2. A rotor as claimed in claim 1, characterized in that said articulating means (35, 36) connecting said blades (3) to said hub (4) comprise at least respective rotating pairs (36) defining respective pitch-change axes (R) lying in said plane (α) of said hub (4) and through said pole (0).

3. A rotor as claimed in claim 2, characterized in that said articulating means (35, 36) connecting said blades (3) to said hub (4) comprise, for each blade (3), a spherical articulated joint (35) having a center (C) along the respective said pitch-change axis (R).

4. A rotor as claimed in claim 3, characterized by comprising, for each blade (3), a pitch-change lever (40) connected to and rotating rigidly with said blade (3) about said pitch-change axis (R); said spherical articulated joint (35) being interposed between said pitch-change lever (40) and said hub (4).

5. A rotor as claimed in claim 1, characterized in that said hub (4) is a contoured plate; and in that said driven member (7) comprises two flanges (19, 20) on opposite sides of said hub (4) and substantially symmetrical with respect to said plane (α) of the hub (4).

6. A rotor as claimed in claim 5, characterized by comprising two spherical elastomeric bearings (30, 31) having a center at said pole (0); said bearings (30, 31) being located on axially opposite sides of one (19) of said flanges (19, 20) of said driven member (7), and connecting said flange (19) to said drive shaft (2) in two axial directions.

7. A rotor as claimed in claim 5, characterized in that said hub (4) is substantially star-shaped with a number of radial arms (14), equal in number to the blades (3) and to which the respective said blades (3) are connected by said articulating means (35, 36), and an equal number of intermediate drive portions (15) interposed between said arms (14) and fixed rigidly to said driven member (7).

8. A rotor as claimed in claim 7, characterized in that each of said arms (14) is connected integrally to the adjacent said intermediate drive portions (15) by two beam members (16).

9. A rotor as claimed in claim 8, characterized in that said hub (4) comprises a central opening (13); and in that said driven member (7) has a hollow, substantially cagelike structure.

10. A rotor as claimed in claim 9, characterized in that said pitch-change levers (40) extend in a substantially tangential direction, and are housed in said drive member (7) and in said opening of said hub (4).

11. A rotor as claimed in claim 1, characterized in that said torque transmitters (11) are equal in number to said blades (3) and interposed between the blades (3).

12. A rotor as claimed in claim 11, characterized in that said torque transmitters (11) are defined by cantilever members having respective end attachments (60), and each connected to a respective said first attachment (56) and to a respective said second attachment (57).

13. A rotor as claimed in claim 12, characterized in that said cantilever members (11) each comprise a number of plates (64) having a rectangular cross section elongated tangentially, and arranged side by side radially.

14. A rotor as claimed in claim 13, characterized in that said plates (64) are separated from one another by a clearance (g).

15. A rotor as claimed in claim 13, characterized in that said plates (64) are curved, with the convexity facing outwards of said rotor (1).

16. A rotor as claimed in claim 13, characterized in that said plates (64) are made of carbon-fiber-based composite material.

17. A rotor as claimed in claim 11, characterized in that said torque transmitters comprise respective compass mechanisms (11'), each defined by two rods (65, 66) hinged to a respective said first attachment (56) and to a respective said second attachment (57), and connected to each other by a spherical articulated joint (67).

* * * * *